(12) United States Patent
Hofkirchner et al.

(10) Patent No.: US 8,896,166 B2
(45) Date of Patent: Nov. 25, 2014

(54) ELECTRIC DRIVE UNIT

(75) Inventors: Rainer Hofkirchner, St. Valentin (AT); Daniel Prix, Ebental (AT)

(73) Assignee: MAGNA Powertrain AG, Lannach (AT)

( * ) Notice: Subject to any disclaimer, the term of this patent is extended or adjusted under 35 U.S.C. 154(b) by 285 days.

(21) Appl. No.: 13/580,093

(22) PCT Filed: Jan. 28, 2011

(86) PCT No.: PCT/EP2011/051250
§ 371 (c)(1),
(2), (4) Date: Sep. 27, 2012

(87) PCT Pub. No.: WO2011/101222
PCT Pub. Date: Aug. 25, 2011

(65) Prior Publication Data
US 2013/0119793 A1   May 16, 2013

(30) Foreign Application Priority Data

Feb. 19, 2010   (DE) .......................... 10 2010 008 584
Oct. 11, 2010   (DE) .......................... 10 2010 048 131

(51) Int. Cl.
*H02K 9/00*   (2006.01)

(52) U.S. Cl.
USPC ............................................ 310/54; 310/59

(58) Field of Classification Search
USPC .................................... 310/52–59, 83, 98–99
See application file for complete search history.

(56) References Cited

U.S. PATENT DOCUMENTS

| | | | | |
|---|---|---|---|---|
| 5,472,059 A | * | 12/1995 | Schlosser et al. | 180/65.51 |
| 5,889,342 A | * | 3/1999 | Hasebe et al. | 310/54 |
| 6,114,784 A | * | 9/2000 | Nakano | 310/59 |
| 6,329,731 B1 | * | 12/2001 | Arbanas et al. | 310/52 |
| 7,800,260 B2 | * | 9/2010 | Komatsu et al. | 310/54 |
| 2001/0004172 A1 | | 6/2001 | Sakurai et al. | |
| 2004/0124722 A1 | | 7/2004 | Uchida et al. | |
| 2005/0006963 A1 | * | 1/2005 | Takenaka et al. | 310/52 |
| 2012/0313465 A1 | * | 12/2012 | Prix | 310/54 |

FOREIGN PATENT DOCUMENTS

| | | |
|---|---|---|
| CN | 101159397 A | 4/2008 |
| DE | 19950660 B4 | 2/2004 |
| EP | 1049234 A2 | 11/2000 |
| EP | 1077522 A1 | 2/2001 |
| EP | 1571751 A1 | 9/2005 |
| JP | 2006-248417 A | 9/2006 |
| JP | 2008-193863 A | 8/2008 |
| WO | 2009/113456 A1 | 9/2009 |

* cited by examiner

*Primary Examiner* — Thanh Lam
(74) *Attorney, Agent, or Firm* — Jordan IP Law, LLC; Todd A. Vaughn

(57) ABSTRACT

An electric drive unit includes an electric motor, which has a stator and a rotor, a gearbox, an electric circuit and a housing. The housing forms a motor compartment in which the electric motor is arranged and a gearbox chamber in which at least a part of the gearbox is arranged. The electric drive unit also includes a lubricating circuit in which a lubricating fluid is conveyed in order to lubricate and cool the gearbox and the rotor of the electric motor, the lubricating fluid circulating between the motor compartment and the gearbox chamber. The drive unit further includes a cooling circuit in which a cooling fluid is conveyed in order to cool the electric circuit and also the stator of the electric motor. The cooling fluid of the cooling circuit is connected to the lubricating fluid of the lubricating circuit in such a manner as to be able to exchange heat.

20 Claims, 1 Drawing Sheet

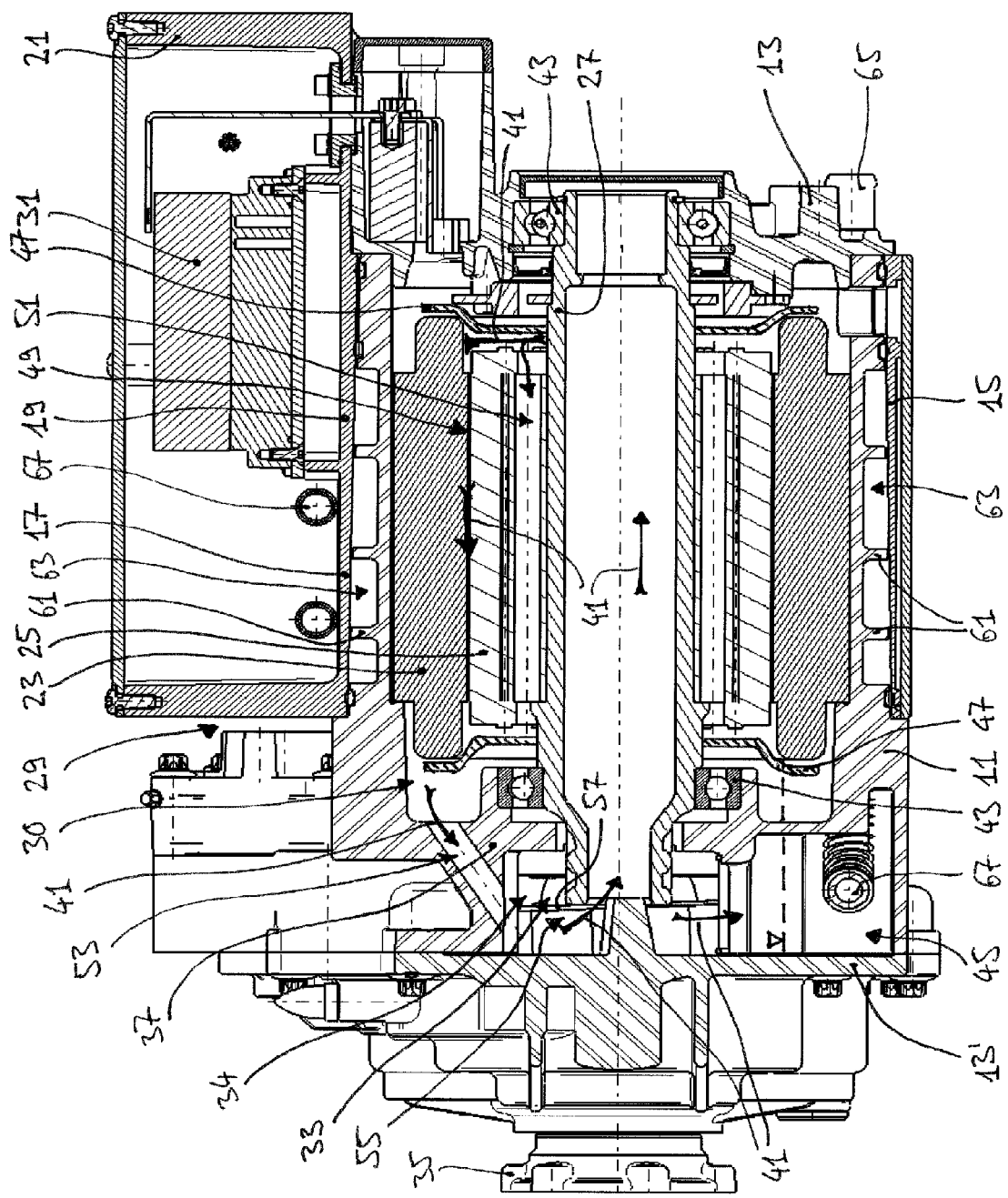

ELECTRIC DRIVE UNIT

CROSS-REFERENCE TO RELATED APPLICATIONS

The present application is a National Stage Application of PCT International Application No. PCT/EP2011/051250 (filed on Jan. 28, 2011), under 35 U.S.C. §371, which claims priority to German Patent Application Nos. 10 2010 008 584.7 (filed on Feb. 19, 2010) and 10 2010 048 131.9 (filed on Oct. 11, 2010), which are each hereby incorporated by reference in their respective entireties.

FIELD OF THE INVENTION

The invention relates to an electric drive unit that is used, for example, in an electric or hybrid-electric driven vehicle as a drive source on one of the vehicle axles. The drive unit comprises an electric motor that has a stator and a rotor which can rotate within the stator. The electric motor concerned can be, for example, a three-phrase asynchronous motor. In addition, the drive unit comprises a gearbox that is coupled on the input side to an output of the electric motor. The gearbox concerned can be, for example, a reduction gear unit and/or a differential gearbox. In addition, the drive unit comprises an electric circuit, which is, for example, a switch-mode power supply for the electric motor, in particular an inverter. In addition, the drive unit comprises a housing that forms a motor compartment and a gearbox chamber, wherein the electric motor is arranged in the motor compartment and the gearbox is arranged at least partially in the gearbox chamber.

In the case of a drive unit of this type, it is necessary to use an effective cooling concept in order to achieve a high level of efficiency with respect to the electric motor and in order to protect the electric circuit from overheating. In addition, it is necessary to cool and lubricate the gearbox.

SUMMARY OF THE INVENTION

It is an object of the invention to provide an electric drive unit of the aforementioned type, in which the electric motor and the allocated electric circuit are cooled in an effective manner and also the gearbox is sufficiently cooled and lubricated, wherein the electric drive unit is to be of a simple and compact construction.

This object is achieved by an electric drive unit having an electric motor, which comprises a stator and a rotor, a gearbox, an electric circuit and a housing, wherein the housing forms a motor compartment in which is arranged the electric motor and wherein the housing in addition forms a gearbox chamber in which at least a part of the gearbox is arranged, wherein the drive unit comprises a lubricating circuit in which a lubricating fluid is conveyed in order to lubricate and to cool the rotor of the electric motor and the gearbox, wherein the lubricating fluid circulates between the motor compartment and the gearbox chamber, and wherein the drive unit comprises a cooling circuit in which a cooling fluid is conveyed in order to cool the stator of the electric motor and to cool the electric circuit, wherein the cooling fluid of the cooling circuit is connected to the lubricating fluid of the lubricating circuit in such a manner as to be able to exchange heat.

Consequently, the electric drive unit comprises a lubricating circuit, which is allocated at least to the rotor of the electric motor and to a part of the gearbox, and a cooling circuit which is independent therefrom and is allocated to the stator of the electric motor and to the electric circuit. The separate arrangement of the two circuits renders it possible to adapt for each circuit the fluid used and their temperature level during the operation of the drive unit in an optimum manner to suit the respective lubricating and/or cooling function. Similarly, the rotor of the electric motor and components of the gearbox can be lubricated and cooled by the lubricating fluid of a common lubricating circuit, as a consequence of which a simple and compact construction of the electric drive unit is achieved. Since the lubricating fluid circulates between the different regions of the housing (motor compartment and gearbox chamber), metal particles that are possibly formed by abrasive wear in the gearbox are prevented from contaminating the electric motor. By virtue of the fact that the two circuits are mutually connected in such a manner as to be able to exchange heat, any waste heat produced in the drive unit can be discharged in a particularly effective manner.

Advantageous embodiments of the invention are disclosed hereinunder and in the subordinate claims.

The lubricating circuit and the cooling circuit preferably have different temperature levels during the operation of the electric drive unit, wherein, as a result of being mutually connected in such a manner as to be able to exchange heat, the cooling fluid of the cooling circuit is also used to cool the lubricating fluid of the lubricating circuit. In other words, a lower temperature level is provided for the cooling circuit than for the lubricating circuit, wherein the cooling fluid draws off heat from the lubricating fluid via a heat exchanger. As a consequence, two different temperature levels can be maintained in a stable manner in order to be able to operate the electric motor at a high level of efficiency and to reliably protect the allocated electric circuit from overheating.

The lubricating fluid of the lubricating circuit is preferably conveyed along the rotor of the electric motor and also along the components of the gearbox in order to lubricate and to cool the rotor and the gearbox components.

In accordance with a preferred embodiment, the motor compartment and the gearbox chamber of the housing are mutually separated by a separating wall, wherein the lubricating fluid circulates through openings in the separating wall between the motor compartment and the gearbox chamber, and wherein a filter device is provided for the lubricating fluid that passes from the gearbox chamber into the motor compartment. The filter device can be arranged directly on the separating wall or by forming an intermediate chamber adjacent thereto. By virtue of a separating wall of this type having an allocated filter device, it is possible in a particularly effective manner to prevent the electric motor from being contaminated by any particles originating from the gearbox chamber. In particular, it is possible as a consequence to prevent the metal particles from passing from the gearbox chamber into the motor compartment and, for example, from damaging the insulation of the stator windings therein or to prevent said particles from passing into the air gap of the electric motor and as a consequence impairing its operational reliability.

In accordance with an advantageous embodiment, a first discharge channel passes through the aforementioned separating wall and the lubricating fluid can flow through said discharge channel from the motor compartment into the gearbox chamber. In addition, a second discharge channel preferably passes through the separating wall and the lubricating fluid can flow through said second discharge channel in the opposite direction, i.e. from the gearbox chamber into the motor compartment. In this case, the aforementioned filter device is provided in or on the second discharge channel. In contrast, a filter device is not absolutely necessary in the first discharge channel.

In order to achieve the desired circulation of the lubricating fluid in the lubricating circuit between the motor compartment and the gearbox chamber, a first delivery device is provided in the motor compartment, which first delivery device conveys the lubricating fluid to the components of the electric motor (in particular to the rotor) and/or in an upward direction. Consequently, the lubricating fluid conveyed through the first delivery device can be dispersed under the influence of gravity in the direction of the gearbox chamber. In addition, a second delivery device is preferably provided in the gearbox chamber, which second delivery device conveys the lubricating fluid to components of the gearbox and/or in an upward direction. As a consequence, the lubricating fluid conveyed by means of the second delivery device can flow back under the influence of gravity into the motor compartment.

The aforementioned first delivery device can comprise, in particular, delivery vanes that are connected in a torque proof manner to the rotor of the electric machine in such a manner that, during the rotational movement of the rotor, the lubricating fluid is propelled towards the relevant components of the electric machine and/or propelled in an upward direction or raised up by means of the delivery vanes. Preferably, the delivery vanes are embodied by impeller blades that intermittently dip into an oil sump.

The aforementioned second delivery device can, in particular, comprise a toothed wheel pump in order to pump the lubricating fluid in the gearbox chamber to the components of the gearbox and/or in an upward direction. The toothed wheel pump can at least partially be embodied by the gearbox of the drive unit as a consequence of which the additional expenditure with regard to embodying the second delivery device is advantageously low.

In addition, a conveying device is provided in the motor compartment in order to convey in the direction of the gearbox chamber the lubricating fluid that is conveyed to the components of the electric motor. Likewise, a conveying device is provided in the gearbox chamber in order to convey in the direction of the motor compartment the lubricating fluid that is conveyed to the components of the gearbox. The aforementioned conveying devices can be embodied, for example, by grooves, channels or pipes that are embodied as an integral part of the housing or separately from the housing. An annular gap embodied between the stator and the rotor of the electric motor can also be used in the motor compartment as a conveying device for the lubricating fluid.

Preferably, the housing of the drive unit comprises a sump for the lubricating fluid of the lubricating circuit, wherein the sump forms a heat exchanger for discharging heat from the lubricating fluid into the cooling fluid of the cooling circuit. During the operation of the electric drive unit, a part of the lubricating fluid collects in the sump after said lubricating fluid has lubricated and cooled the rotor of the electric motor and/or components of the gearbox. Consequently, heat is discharged in or at the sump of the lubricating circuit to the cooling circuit in a particularly effective manner.

In particular, at least one pipe of the cooling circuit can be guided through the sump in order to enhance the desired heat transfer. For example, a pipe of the cooling circuit can be routed through the sump in the form of a cooling coil.

In addition to the explained heat discharge to the cooling circuit, the lubricating fluid that has collected in the sump can also discharge heat into the environment, for example via a wall section of the housing and/or via cooling ribs in the housing.

As far as the cooling fluid in the cooling circuit is concerned, this is preferably conveyed along the stator of the electric motor or along a housing section encompassing the stator in order to cool the stator. The heat can be discharged from the stator to the cooling fluid in a particularly effective manner by surface wetting the stator and/or one of the housing sections encompassing the stator.

It is preferred for this purpose if the cooling circuit peripherally encompasses the motor compartment of the housing. In particular, the cooling fluid can be conveyed along the cooling channels that extend along a peripheral surface that is embodied by means of the stator of the electric motor or by means of a housing section that encompasses the stator.

In order also to be able to cool the aforementioned electric circuit in an effective manner by means of the cooling fluid, it is preferred if the electric drive unit comprises a switching housing section that receives the electric circuit. In this case, the cooling channel is also guided to the switching housing section in order to cool the electric circuit arranged therein.

BRIEF DESCRIPTION OF THE DRAWINGS

The invention is explained hereinunder merely by way of example with reference to the drawing.

FIG. 1 illustrates a longitudinal section view of an electric drive unit.

DETAILED DESCRIPTION OF EMBODIMENTS

The electric drive unit illustrated comprises a metal housing 11 that is closed on both its end faces by a respective cover 13, 13'. The metal housing 11 is preferably cast from aluminum. In addition, the drive unit comprises a synthetic material housing 15 having a cylindrical peripheral surface 17 that peripherally encompasses a cylindrical peripheral surface 19 of the metal housing 11. In addition, the synthetic material housing 15 comprises a rectangular box-shaped switching housing section 21 that is placed on the upper face.

Within the peripheral surface 19, a stator 23 is installed, for example pressed, into the metal housing 11. A rotor 25 is arranged within the stator 23, which rotor is connected in a torque proof manner to a hollow output shaft 27 that is rotatably mounted in the metal housing 11. The stator 23 and the rotor 25 form an electric motor 29, in particular a three-phase-asynchronous motor. The electric motor 29 is arranged in a motor compartment 30 of the metal housing 11. The electric motor 29 is allocated an electric circuit that comprises, for example, an inverter 31 and is arranged within the switching housing section 21. In addition, the electric circuit can comprise, for example, a DC/DC convertor and/or a charging device.

The illustrated electric drive unit comprises, in addition, a helical gearbox 33 that is arranged in a gearbox chamber 34 of the metal housing 11. The helical gearbox 33 is coupled on the input side to the output shaft 27 of the electric motor 29. The helical gearbox 33 is configured as a reduction gear unit and is coupled on the output side to the input of a differential gearbox (not illustrated) that in turn comprises two outputs. A connecting flange 35 is allocated to each of the two outputs and an axle shaft can be fastened to said connecting flange. Only one of the connecting flanges 35 is visible in the illustrated cross-sectional view. The gearbox chamber 34 of the metal housing 11 is separated from the motor compartment 30 by means of a separating wall 37.

The illustrated electric drive unit comprises, in addition, a closed lubricating circuit in which lubricating oil is conveyed, wherein the direction of flow of the lubricating oil is illustrated by the arrows 41. The lubricating oil is used to cool the rotor 25 of the electric motor 29 and also to lubricate the rotor 25 and/or the bearing 43 of the output shaft 27. In addition, the lubricating oil is used to lubricate and to cool the components of the helical gearbox 33. As explained hereinunder, the lubricating oil is circulated for this purpose between the motor compartment 30 and the gearbox chamber 34.

The lubricating oil is collected in a sump 45 of the lubricating circuit. A plurality of impeller blades 47 are fastened to the rotating output shaft 27, which impeller blades intermittently dip into the lubricating oil that has collected in the sump 45 and said impeller blades propel said lubricating oil in an upward direction. Consequently, the impeller blades 47 form a first delivery device for the lubricating oil. The lubricating oil that has been propelled in an upward direction passes into the annular gap that is formed between the stator 23 and the rotor 25 of the electric motor 29. In addition, the lubricating oil passes into an annular chamber 51 that is formed between the rotor 25 and the output shaft 27. As a consequence, the rotor 25 of the electric motor 29 is constantly wetted with the lubricating oil.

The lubricating oil that is conveyed in this manner in the upper region of the motor compartment 30 can pass into the gearbox chamber 34 via a first discharge channel 53 that passes through the separating wall 37. In the gearbox chamber 34, the lubricating oil wets the components of the helical gearbox 33 in order likewise to lubricate and cool said components. In addition to the intended reduction effect, the helical gearbox 33 forms a toothed wheel pump that conveys the lubricating oil back in an upward direction, i.e. the helical gear box 33 forms a second delivery device for the lubricating oil. The lubricating oil that is propelled in an upward direction in this manner within the gearbox chamber 34 can flow back in the direction of the motor compartment 30 via a second discharge channel 55 that passes through the separating wall 37 in the opposite direction with respect to the first discharge channel 53. However, it is necessary for this purpose for the lubricating oil to flow through an oil filter 57 that protects the electric motor 29, which is located in the motor compartment 30, from any contaminating particles from the gearbox chamber 34. In the case of the exemplary embodiment illustrated here, the second discharge channel 55 issues into the inner chamber of the hollow output shaft 27. The lubricating oil can pass from said inner chamber via the open end and through the outlet openings, not illustrated, into the sump 45.

In addition to the lubricating circuit described, the illustrated electric drive unit comprises an open cooling circuit in which cooling water circulates. The cooling water is used to cool the stator 23 of the electric motor 29 and also to cool the inverter 31.

The stator 23 is cooled via the peripheral surface 19 of the metal housing 11. A plurality of separating piece or webs 61 are embodied on the outer face of the peripheral surface 19. A plurality of cooling channels 63 are formed through the separating piece or webs 61, the outer face of the peripheral surface 19 of the metal housing 11 and the inner face of the peripheral surface 17 of the synthetic material housing 15, through which cooling channels the cooling water can flow in the peripheral direction along the peripheral surface 19 of the metal housing 11. As a consequence, a peripherally closed cooling water jacket is formed in order to cool the stator 23, which is surface-connected thereto, by conducting heat along the metal housing 11.

A plurality of cooling water connections 65 are provided on the synthetic material housing 15 in order to convey the required cooling water to the cooling channels 63 and/or to carry said cooling water away therefrom. A branch of the cooling water circuit formed in this manner also leads to the switching housing section 21 in order by means of the cooling water to cool the inverter 31 that is arranged there.

The abovementioned lubricating circuit and the cooling circuit are mutually connected in such a manner as to be able to exchange heat. A pipe 67 of the cooling circuit is routed for this purpose through the sump 45 of the lubricating circuit. The sump 45 and the pipe 67 thus form a heat exchanger in order to discharge heat from the lubricating oil to the cooling water.

Consequently, a lubricating circuit and a cooling circuit that have different temperature levels are formed, so that the outer face of the stator 23 of the electric motor 29 and the inverter 31 can be maintained by means of the cooling water at a lower temperature level (approx. 80° C.) than the temperature of the lubricating oil (approx. 130° C.). As a consequence, an increased power density is achieved for the electric motor 29 and the inverter 31 is reliably protected from overheating.

A single lubricating circuit renders it possible in this case to lubricate and to cool the relevant components both of the electric motor 29 and also of the helical gearbox 33 (and of the differential gearbox, not illustrated here). As a consequence, the electric motor 29 can be sealed in a simpler manner at the side facing the helical gearbox 33. As a result of using the impeller blades 47 as a first delivery device and using the helical gearbox 32 as a second delivery device (toothed wheel pump), it is no longer necessary to provide a separate oil pump for the lubricating circuit. In addition, the use of the impeller blades 47 as an oil delivery device at the side remote from the helical gearbox 33 renders it possible to lubricate the bearing 43 of the output shaft 47, which bearing is located at said side.

LIST OF REFERENCE NUMERALS

11 Metal housing
13, 13' Housing cover
15 Synthetic material housing
17 Peripheral surface of the synthetic material housing
19 Peripheral surface of the metal housing
21 Switching housing section
23 Stator
25 Rotor
27 Output shaft
29 Electric motor
30 Motor compartment
31 Inverter
33 Helical gearbox
34 Gearbox chamber
35 Connecting flange
37 Separating wall
41 Flow direction of the lubricating oil
43 Bearing of the output shaft
45 Sump
47 Impeller blade
49 Annular gap
51 Annular chamber
53 First discharge channel
55 Second discharge channel
57 Oil filter
61 Separating piece or web
63 Cooling channel
65 Cooling water connection
67 Pipe of the cooling circuit

What is claimed is:
1. An electric drive unit comprising:
an electric motor having a stator and a rotor;
a gearbox;
an electric circuit;

a housing having a motor compartment in which is provided the electric motor, and a gearbox chamber in which is provided at least a part of the gearbox;

a lubricating circuit through which flows a first fluid between the motor compartment and the gearbox chamber to lubricate and to cool the rotor and the gearbox;

a cooling circuit at the peripherally of the motor compartment and through which flows a second fluid to cool the stator and the electric circuit;

a first delivery device provided in the motor compartment and in communication with the lubricating circuit to convey the first fluid to components of the electric motor; and a second delivery device provided in the gearbox chamber and in communication with the lubricating circuit to convey the first fluid to components of the gearbox, wherein the lubricating circuit and the cooling circuit are configured to enable heat exchange between the first fluid and the second fluid during operation of the electric drive unit.

2. The electric drive unit of claim 1, wherein during operation of the electric drive unit the lubricating circuit and the cooling circuit have different operating temperature levels.

3. The electric drive unit of claim 2, wherein during operation of the electric drive unit the lubricating circuit and the cooling circuit have different operating temperature levels the second fluid is configured to cool the first fluid.

4. The electric drive unit of claim 1, wherein the first fluid of the flows along the rotor and also components of the gearbox.

5. The electric drive unit of claim 1, wherein the housing includes a wall configured to separate the motor compartment and the gearbox chamber, the wall having through openings through which flows the first fluid flows.

6. The electric drive unit of claim 5, further comprising a first channel which passes through the wall and through which the first fluid flows from the motor compartment into the gearbox chamber.

7. The electric drive unit of claim 6, further comprising a second channel which passes through the wall and through which the first fluid flows from the gearbox chamber into the motor compartment, wherein the filter device is provided in the second channel.

8. The electric drive unit of claim 7, wherein the first delivery device comprises at least one vane connected in a torque proof manner to the rotor in order, during rotational movement of the rotor, to convey the lubricating fluid towards the components of the electric motor and/or in an upward direction.

9. The electric drive unit of claim 7, wherein the second delivery device comprises a toothed wheel which pumps the first fluid to the components of the gearbox and/or in an upward direction.

10. The electric drive unit of claim 9, wherein the toothed wheel pump is embodied at least partially by the gearbox of the drive unit.

11. The electric drive unit of claim 7, wherein at least one of the first conveying device and the second conveying device is provided in the motor compartment to convey the first fluid from the components of the electric motor to the gearbox chamber.

12. The electric drive unit of claim 11, wherein at least one of the first conveying device and the second conveying device is provided in the gearbox chamber to convey the first fluid from the components of the gearbox to the motor compartment.

13. The electric drive unit of claim 1, wherein the housing comprises a sump for the first fluid, the sump forming a heat exchanger which permits heat exchange between the first fluid and the second fluid.

14. The electric drive unit of claim 13, wherein at least one pipe of the cooling circuit is routed through the sump.

15. The electric drive unit of claim 1, wherein the second fluid flows along the stator or along a housing section that encompasses the stator.

16. The electric drive unit of claim 1, further comprising a switching housing section in which is provided the electric circuit.

17. The electric drive unit of claim 16, wherein the cooling circuit is routed to the switching housing section to cool the electric circuit.

18. A drive unit comprising:
a stator;
a rotor;
a gearbox;
an electric circuit;
a first fluid circuit through which flows a first fluid to cool the rotor and the gearbox;
a second fluid circuit through which flows a second fluid to cool the stator and the electric circuit;
a first delivery device in communication with the first circuit and which conveys the first fluid to the rotor and the stator;
a second delivery device in communication with the first circuit and which conveys the first fluid to components of the gearbox; and
a heat exchanger which permits heat exchange between the first fluid and the second fluid during operation of the drive unit.

19. A drive unit comprising:
a motor having a stator and a rotor;
a gearbox;
an electric circuit;
a housing in which is provided the electric motor and the gearbox, the housing having a wall which separates the motor from the gearbox;
a first fluid circuit through which flows a first fluid to cool the rotor and the gearbox;
a second fluid circuit through which flows a second fluid to cool the stator and the electric circuit;
a heat exchanger which permits heat exchange between the first fluid and the second fluid during operation of the drive unit;
a first channel which passes through the wall and through which flows the first fluid from the motor compartment into the gearbox; and
a second channel which passes through the wall and through which flows the first fluid from the gearbox to the motor.

20. The drive unit of claim 19, wherein the filter device is provided in the second channel.

* * * * *